(12) United States Patent
Yu et al.

(10) Patent No.: US 12,355,730 B2
(45) Date of Patent: Jul. 8, 2025

(54) METHOD FOR CONSTRUCTION OF A HIGH-SECURITY PRIVATE GROUP NETWORK

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 160 days.

(21) Appl. No.: 18/368,060

(22) Filed: Sep. 14, 2023

(65) Prior Publication Data
US 2024/0195784 A1 Jun. 13, 2024

(51) Int. Cl.
*H04L 9/40* (2022.01)
*H04L 67/104* (2022.01)

(52) U.S. Cl.
CPC ........ *H04L 63/0272* (2013.01); *H04L 63/083* (2013.01); *H04L 67/1046* (2013.01)

(58) Field of Classification Search
None
See application file for complete search history.

(56) References Cited

U.S. PATENT DOCUMENTS

| | | | |
|---|---|---|---|
| 2014/0115341 A1* | 4/2014 | Robertson | G06F 21/30 713/183 |
| 2016/0294793 A1* | 10/2016 | Larson | H04L 63/1408 |
| 2021/0185017 A1* | 6/2021 | Chen | H04L 63/0272 |
| 2021/0234835 A1* | 7/2021 | Chen | H04L 67/1001 |

* cited by examiner

*Primary Examiner* — Quang N Nguyen
(74) *Attorney, Agent, or Firm* — BACON & THOMAS, PLLC

(57) ABSTRACT

A method for construction of a high-security private group network is disclosed in the present application: a first user machine is electrically connected with a first private communication box and dependent upon specific authentication to join a first self-configuration peer-to-peer virtual private network constructed by the first private communication box using operating system level virtualization; a second user machine is electrically connected with a second private communication box and dependent upon specific authentication to join the first self-configuration peer-to-peer virtual private network constructed by the second private communication box using operating system level virtualization; packets are transmitted between the first user machine and the second user machine through the first self-configuration peer-to-peer virtual private network.

8 Claims, 6 Drawing Sheets

```
┌─────────────────────────────────────────────────────────┐
│ A first user machine is electrically connected with a  │
│ first private communication box and dependent upon      │──1
│ specific authentication to join a first self-           │
│ configuration peer-to-peer virtual private network      │
│ constructed by the first private communication box      │
│ using operating system level virtualization.            │
└─────────────────────────────────────────────────────────┘
                          ↓
┌─────────────────────────────────────────────────────────┐
│ A second user machine is electrically connected with a │
│ second private communication box and dependent upon     │──2
│ specific authentication to join the first self-         │
│ configuration peer-to-peer virtual private network      │
│ constructed by the second private communication box     │
│ using operating system level virtualization.            │
└─────────────────────────────────────────────────────────┘
                          ↓
┌─────────────────────────────────────────────────────────┐
│ Packets are transmitted between the first user machine │
│ and the second user machine through the first self-     │──3
│ configuration peer-to-peer virtual private network.     │
└─────────────────────────────────────────────────────────┘
```

METHOD FOR CONSTRUCTION OF A HIGH-SECURITY PRIVATE GROUP NETWORK

BACKGROUND OF THE INVENTION

Field of the Invention

The present application relates to a method for construction of a private network which depends on a dedicated communication box and specific authentication to join a self-configuration peer-to-peer virtual private network constructed through operating system level virtualization for transmission of packets via the self-configuration peer-to-peer virtual private network and isolation of risks like packet sniffing on a physical network.

Description of the Prior Art

In recent years, easy-to-use electronic facilities that have appealed to more and more office workers, who clearly prefer teleworking popularized due to outbreak of the COVID-19 pandemic but are short of information security knowledge frequently, are criticized for various issues such as user dependency, privacy negligent and an enterprise's data or trade secrets exposed to dangers.

For that matter, how to protect individual privacy and official security inside an environment for big data tracking on the internet is a well-known issue. Additionally, stability and ease of use for data sharing between peers make data exchanges more difficult than expected.

Furthermore, the productions and disseminations of copyrighted technologies, devices or services, the behaviors of circumventing Digital Rights Management (DRM), and the responsibilities of online service providers for users' infringement acts shall be subject to the Digital Millennium Copyright Act (DMCA) enacted by the U.S.A. out of consideration for criminal offenses. Accordingly, the extent of data sharing including video editing, dub in background music or rational uses of references is involved in the copyright audit.

There have been several patents related to data sharing or security disclosed as follows:

U.S. Ser. No. 10/007,019 discloses a method of allowing an employee associated with a supplier enterprise to access a supplier-owned intranet owned by the supplier enterprise from a supplier-controlled computing device located within a semiconductor fabrication facility, that is, a method for allowing secure end-to-end communication between the supplier-controlled computing device and the supplier-owned intranet, wherein a plurality of fab-owned and operated client systems located within the facility are connected to a fab-owned intranet by means of a first physical connection type. In one embodiment, the method includes: connecting the computing device to the fab-owned intranet through a node using a second physical connection type different from the first physical connection type; establishing an isolation pipe through the fab-owned intranet between the node and a hub/firewall by virtual private network technology; generating a request to logon to the supplier-owned intranet from the computing device; formatting the request in a secure internet protocol such that the request is broken up into multiple packets, each of which includes at least a header portion and an encrypted data portion; transmitting the formatted request through the isolation pipe over the fab-owned intranet to the hub/firewall and then over the public internet to the supplier-owned intranet according to end-to-end encryption.

U.S. Ser. No. 13/911,789 discloses systems and methods utilizing application-specific access to a virtual private network (VPN). A method may comprise: receiving, from an application executed on a device, a request for a network data flow to a private network; comparing identification information associated with the application against a set of rules stored in a memory of the device wherein the set of rules identifies conditions for the application to be authorized to access the private network; establishing a connection for the network data flow upon the identification information satisfying the conditions for the application to access the private network.

TW 107115034 discloses a data exchange group system and a method thereof, which features: a shared file is saved in a file storage space of a storage device via the internet and also recorded in an intrinsic file list of the storage device; the shared file is configured to be shared in the storage device and also recorded in a shared file list of the storage device; the shared file is configured to be queried in a transaction system and recorded in a group file list of the storage device; the shared file encrypted and authorized in the transaction system is received by a data recipient through an encrypted file connection for the shared file of the storage device.

TW I630488 discloses a VPN service provision system with diversified end-to-end network isolation support, which satisfies flexible provision by network function virtualization and software-defined networking (SDN), promotes safety of end-to-end VPN between enterprises and reduces establishment cost of VPN effectively. In the design of TW I630488, there are multiple virtual routers flexibly arranged in a single server to isolate network traffic from different types of services on the intranet as well as facilities on different local networks and prevent any single facility or system from being invaded and an enterprise's other systems from being hacked. Moreover, a mechanism for network management and network access time control is simplified through Software Defined Network (SDN) for flexibility and safety of network modification.

However, a virtual private network constructed with software is criticized for its innate vulnerability and all distinct virtual private networks constructed on a single facility are probably disconnected due to system crash of the facility.

SUMMARY OF THE INVENTION

In virtue of the above problem, a method for construction of a high-security private group network offered in the present disclosure is based on operating system level virtualization with which all hardware resources are virtually divided into diversified independent virtual hardware and a container with virtual private networks primarily is constructed to replace multiple virtual private networks created on a single system according to application protocols traditionally for no competition in resources between running virtual private networks and a host operating system, guarantee for performance of a virtual private network and significant reduction in mutual interferences between single virtual private networks.

Accordingly, the present disclosure offers a method for construction of a high-security private group network through which a container with virtual private networks primarily is constructed based on operating system level virtualization for fast construction of a virtual private network.

The present disclosure offers a method for construction of a high-security private group network through which the operating system level virtualization technology is embodied to guarantee least signal interference on a single virtual private network and electric connection with the identical virtual private network.

The present disclosure offers a method for construction of a high-security private group network which relies on a virtual private network based on operating system level virtualization to regulate a total number of connected facilities and transmission speeds for proper connection quality.

The present disclosure offers a method for construction of a high-security private group network featuring a login server with which information for connectivity of each communication box is integrated for minimization of connection failure.

To this end, a method for construction of a high-security private group network is embodied according to the following technical solution. In the present disclosure, a method for construction of a high-security private group network based on operating system level virtualization for construction of a virtual private network comprises steps as follows: step 1: a first user machine is electrically connected with a first private communication box and dependent upon specific authentication to join a first self-configuration peer-to-peer virtual private network constructed by the first private communication box using operating system level virtualization; step 2: a second user machine is electrically connected with a second private communication box and dependent upon specific authentication to join the first self-configuration peer-to-peer virtual private network constructed by the second private communication box using operating system level virtualization; step 3: packets are transmitted between the first user machine and the second user machine through the first self-configuration peer-to-peer virtual private network.

The purposes and technical issues in the present disclosure are further embodied by referring to the following technical measures.

In the method, a third user machine is electrically connected with the first private communication box and dependent upon specific authentication to join a second self-configuration peer-to-peer virtual private network constructed by the first private communication box using operating system level virtualization but packets are not transmitted between the second self-configuration peer-to-peer virtual private network and the first self-configuration peer-to-peer virtual private network.

In the method, a fourth user machine is electrically connected with the second private communication box and dependent upon specific authentication to join a second self-configuration peer-to-peer virtual private network constructed by the second private communication box using operating system level virtualization but packets are not transmitted between the second self-configuration peer-to-peer virtual private network and the first self-configuration peer-to-peer virtual private network.

In the method, the first user machine is electrically connected with the first private communication box and dependent upon specific authentication to join a second self-configuration peer-to-peer virtual private network constructed by the first private communication box using operating system level virtualization and packets are transmitted by the first user machine through the second self-configuration peer-to-peer virtual private network.

In the method, a fifth user machine is electrically connected with a second private communication box and dependent upon specific authentication to join the first self-configuration peer-to-peer virtual private network constructed by the second private communication box using operating system level virtualization and packets are transmitted among the first user machine, the second user machine and the fifth user machine through the first self-configuration peer-to-peer virtual private network.

In the method, each of the first private communication box and the second private communication box accesses to the internet for exchanges of network information with a login server.

In the method, the specific authentication means each of an authentication code, a user account/password and an encryption key or a combination thereof.

In the method, the first private communication box and the second private communication box use a virtual private network based on operating system level virtualization to regulate a total number of connected facilities and transmission speeds for proper connection quality.

In the method, the first self-configuration peer-to-peer virtual private network is configured to bridge a local area network such that packets are transmitted to the local area network.

In the method, the first private communication box is capable of bridging the first self-configuration peer-to-peer virtual private network and the second self-configuration peer-to-peer virtual private network for one-way or two-way communication of packets.

Compared with the prior art, a method for construction of a high-security private group network in the present disclosure is effective in: (1) fast constructing a virtual private network due to a container with virtual private networks primarily constructed based on operating system level virtualization; (2) guaranteeing least signal interference on a single virtual private network and electrical connection with the same virtual private network due to the operating system level virtualization technology; (3) guaranteeing connection quality due to a virtual private network based on operating system level virtualization to regulate a total number of connected facilities and transmission speeds; (4) integrating information for connectivity of each communication box by a login server for minimization of connection failure.

BRIEF DESCRIPTIONS OF THE DRAWINGS

DETAILED DESCRIPTIONS OF THE PREFERRED EMBODIMENTS

A method for construction of a high-security private group network is explained in the preferred embodiments for clear understanding of purposes, characteristics and effects of the present application.

Figure 1A:
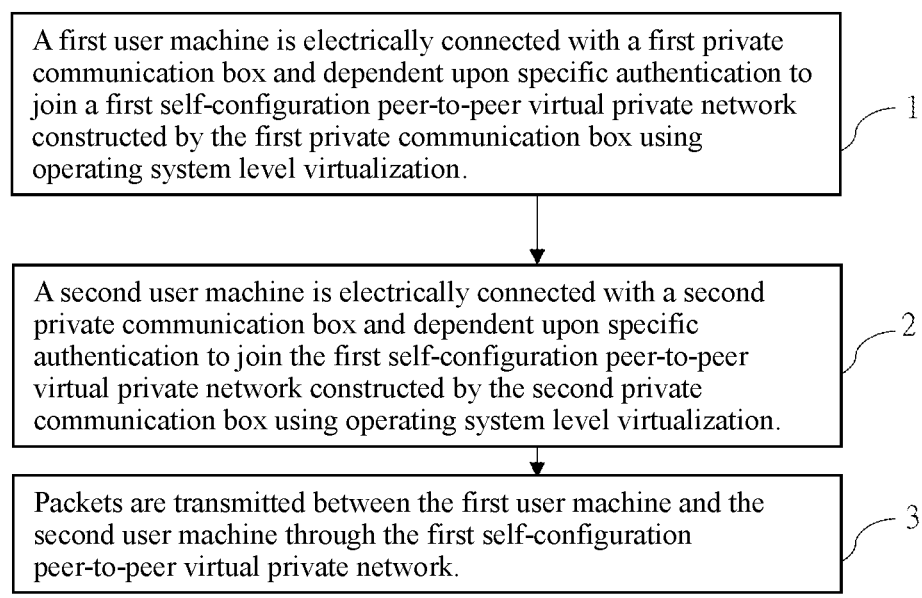
FIG. 1a is a flowchart of a method for construction of a high-security private group network in the first embodiment.
Figure 2A:
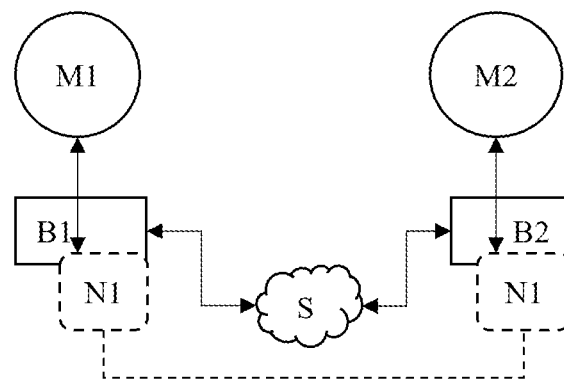
FIG. 2a is a schematic view of a method for construction of a high-security private group network in the first embodiment.

As shown in FIGS. 1a and 2a, the present disclosure is a method for construction of a high-security private group network in the first embodiment; referring to FIG. 1a, which illustrates a method for construction of a high-security private group network based on operating system level virtualization for construction of a virtual private network comprises step 1 (1), step 2 (2) and step 3 (3).

Referring to step 1 (1) in FIG. 1a and FIG. 2a, which illustrate a first user machine (M1) is electrically connected with a first private communication box (B1) and dependent upon specific authentication to join a first self-configuration peer-to-peer virtual private network (N1) constructed by the first user machine (M1) using Operating System Level Virtualization in step 1 (1).

Specifically, the first user machine (M1) is a facility which performs network connectivity such as a desktop computer, a laptop, a tablet PC and a mobile phone in general for internet connection and is electrically connected with the first private communication box (B1), that is, network connectivity is embodied by the first user machine (M1) through wired or wireless connectivity. Moreover, the first private communication box (B1) that is characteristic of internet connection through wired or wireless connectivity with which digital data is accessed and saved effectively is a hardware facility functioning as encryption/decryption operation, running based on a built-in operational system and fulfilling the operating system level virtualization, also known as containerization, technology for virtualization of the OS kernel, that is, all hardware resources are virtually divided into diversified independent virtual hardware rather than a single entity for running inside the kernel; the specific authentication means each of an authentication code, a user account/password and an encryption key or a combination thereof; the first self-configuration peer-to-peer virtual private network (N1) is a virtual private network constructed with a Virtual Private Network (VPN) and Containers for virtual peer-to-peer connectivity through a dedicated line or a tunneling protocol on the existing network and remote access to available internet resources in a dedicated line for high security and management capability.

In practice, the first private communication box (B1) can be installed on an intranet for access to the internet through an internal or external IP address; the first user machine (M1) is an enterprise's file server which assesses to the first private communication box (B1) through the intranet and dependent upon specific authentication to join the first self-configuration peer-to-peer virtual private network (N1) by specific authentication such that the first user machine (M1) joins the first self-configuration peer-to-peer virtual private network (N1).

Referring to step 2 (2) in FIG. 1a and FIG. 2a, which illustrate a second user machine (M2) is electrically connected with a second private communication box (B2) and dependent upon specific authentication to join the first self-configuration peer-to-peer virtual private network (N1) constructed by the second user machine (M2) using operating system level virtualization in step 2 (2).

In the embodiment, the second user machine (M2) is a facility which performs network connectivity such as a desktop computer, a laptop, a tablet PC and a mobile phone in general for internet connection and is electrically connected with the second private communication box (B2), that is, network connectivity is embodied by the second user machine (M2) through wired or wireless connectivity. Moreover, the second private communication box (B2) that is characteristic of internet connection through wired or wireless connectivity with which digital data is accessed and saved effectively is a hardware facility functioning as encryption/decryption operation, running based on a built-in operational system and fulfilling the operating system level virtualization, also known as containerization, technology for virtualization of the OS kernel, that is, all hardware resources are virtually divided into diversified independent virtual hardware rather than a single entity for running inside the kernel; the specific authentication means each of an authentication code, a user account/password and an encryption key or a combination thereof.

In practice, the second private communication box (B2) which can be installed on the intranet for an employee's residence accesses the internet through an internal or external IP address; the second user machine (M2) is the employee's computer facility which assesses to the second private communication box (B2) through the intranet and dependent upon specific authentication to join the first self-configuration peer-to-peer virtual private network (N1) by specific authentication such that the second user machine (M2) joins the first self-configuration peer-to-peer virtual private network (N1).

Finally, referring to step 3 (3) in FIG. 1a and FIG. 2a, which illustrate packets are transmitted between the first user machine (M1) and the second user machine (M2) through the first self-configuration peer-to-peer virtual private network (N1) in step 3 (3).

In practice, after the first user machine (M1) as an enterprise's file server joins the first self-configuration peer-to-peer virtual private network (N1), the second user machine (M2) as an employee's computer facility joins the first self-configuration peer-to-peer virtual private network (N1) through which an enterprise's file server is accessed by the employee's computer facility.

Preferably, each of the first private communication box (B1) and the second private communication box (B2) accesses to the internet for exchanges of network information with a login server (S) and is registered in data of the login server (S) during construction of the first self-configuration peer-to-peer virtual private network (N1); the login server (S) is effective in providing facilities such as the first private communication box (B1) and the second private communication box (B2) with exchanges of network information and located on the internet for better network rates among other connected facilities and stability promotion.

Furthermore, the first private communication box (B1) and the second private communication box (B2) rely on a virtual private network based on operating system level virtualization to regulate a total number of connected facilities and transmission speeds for proper connection quality. For network traffic in realistic network environment, it should be considered that a user's smooth operation is stabilized with a total number of connected facilities and transmission speeds restrained.

Additionally, the first self-configuration peer-to-peer virtual private network (N1) is configured to bridge a local area network such that packets are transmitted to the local area network. This function allows the packets to be accessed by facilities on a local area network associated with the first self-configuration peer-to-peer virtual private network (N1).

Figure 1B:
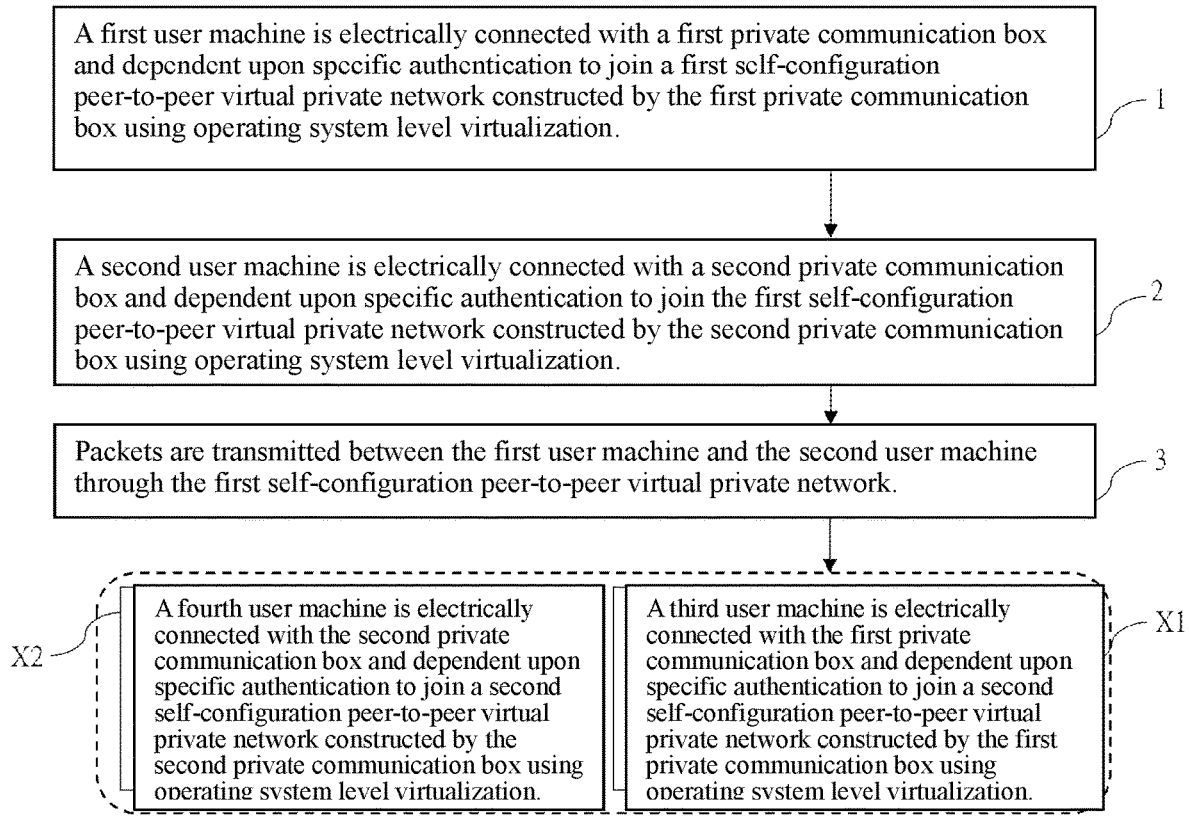
FIG. 1b is a flowchart of a method for construction of a high-security private group network in the second embodiment.
Figure 2B:
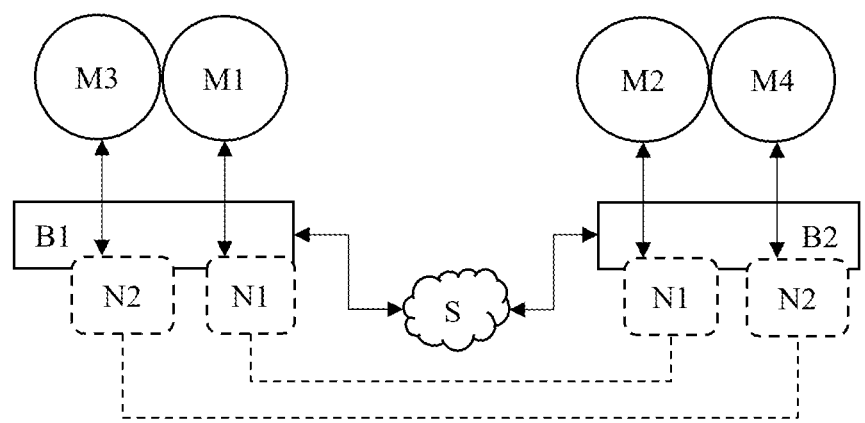
FIG. 2b is a schematic view of a method for construction of a high-security private group network in the second embodiment.

Referring to FIGS. 1b and 2b, which illustrate a method for construction of a high-security private group network in a second embodiment; in the second embodiment, the features identical to those of the first embodiment in FIGS. 1a and 2a and the same symbols marked in FIGS. 1b and 2b are not explained repeatedly. Compared with the first embodiment, the method in the second embodiment comprises step X1 (X1) and step X2 (X2) after step 3 (3) of the first embodiment.

The flowchart in the second embodiment which refers to the flowchart in FIG. 1b comprises step 1 (1), step 2 (2), step 3 (3), step X1 (X1) and step X2 (X2) wherein step 1 (1), step 2 (2) and step 3 (3) are identical to those steps in the first embodiment and not explained repeatedly.

Referring to step X1 (X1) in FIG. 1b and FIG. 2b, which explain step X1 (X1) as follows: a third user machine (M3) is electrically connected with the first private communication box (B1) and dependent upon specific authentication to join a second self-configuration peer-to-peer virtual private network (N2) constructed by the first private communication box (B1) using operating system level virtualization; packets are not transmitted between the second self-configuration peer-to-peer virtual private network (N2) and the first self-configuration peer-to-peer virtual private network (N1).

In practice, the first private communication box (B1) can be installed on an enterprise's intranet, the first private communication box (B1) is connected to the internet through an internal or external IP address, and the third user machine (M3) is a file server of an enterprise's specific department. When the third user machine (M3) is connected to the first private communication box (B1) through the intranet and dependent upon specific authentication to join the second self-configuration peer-to-peer virtual private network (N2) by specific authentication, the third user machine (M3) joins the second self-configuration peer-to-peer virtual private network (N2).

Referring to step X2 (X2) in FIG. 1b and FIG. 2b, which explain step X2 (X2) as follows: a fourth user machine (M4) is electrically connected with the second private communication box (B2) and dependent upon specific authentication to join a second self-configuration peer-to-peer virtual private network (N2) constructed by the second private communication box (B2) using operating system level virtualization; packets are not transmitted between the second self-configuration peer-to-peer virtual private network (N2) and the first self-configuration peer-to-peer virtual private network (N1).

In practice, the second private communication box (B2) can be installed on an intranet for a residence of an employee hired in a specific department, the second private communication box (B2) is connected to the internet through an internal or external IP address, and the fourth user machine (M4) is a computer facility of an employee hired in a specific department. When the fourth user machine (M4) is connected to the second private communication box (B2) through the intranet and dependent upon specific authentication to join the second self-configuration peer-to-peer virtual private network (N2) by specific authentication, the fourth user machine (M4) joins the second self-configuration peer-to-peer virtual private network (N2).

In specific, each of the third user machine (M3) and the fourth user machine (M4) is a facility which performs network connectivity such as a desktop computer, a laptop, a tablet PC and a mobile phone in general for internet connection; the third user machine (M3) is electrically connected with the first private communication box (B1) and the fourth user machine (M4) is electrically connected with the second private communication box (B2), that is, network connectivity is embodied by each of the third user machine (M3) and the fourth user machine (M4) through wired or wireless connectivity; the second self-configuration peer-to-peer virtual private network (N2) is a virtual private network constructed with a Virtual Private Network (VPN) and Containers for virtual peer-to-peer connectivity through a dedicated line or a tunneling protocol on the existing network and remote access to available internet resources in a dedicated line for high security and management capability.

In practice, after the third user machine (M3) as a file server in an enterprise's specific department joins the second self-configuration peer-to-peer virtual private network (N2), the fourth user machine (M4) as a computer facility of an employee hired in an enterprise's specific department joins the second self-configuration peer-to-peer virtual private network (N2) and the file server of the enterprise's specific department is accessed by the computer facility of an employee hired in an enterprise's specific department.

Furthermore, the first private communication box (B1) is capable of bridging the first self-configuration peer-to-peer virtual private network (N1) and the second self-configuration peer-to-peer virtual private network (N2) for one-way or two-way communication of packets. Accordingly, facilities on the first self-configuration peer-to-peer virtual private network (N1) and the second self-configuration peer-to-peer virtual private network (N2) access to one another.

Figure 1C:
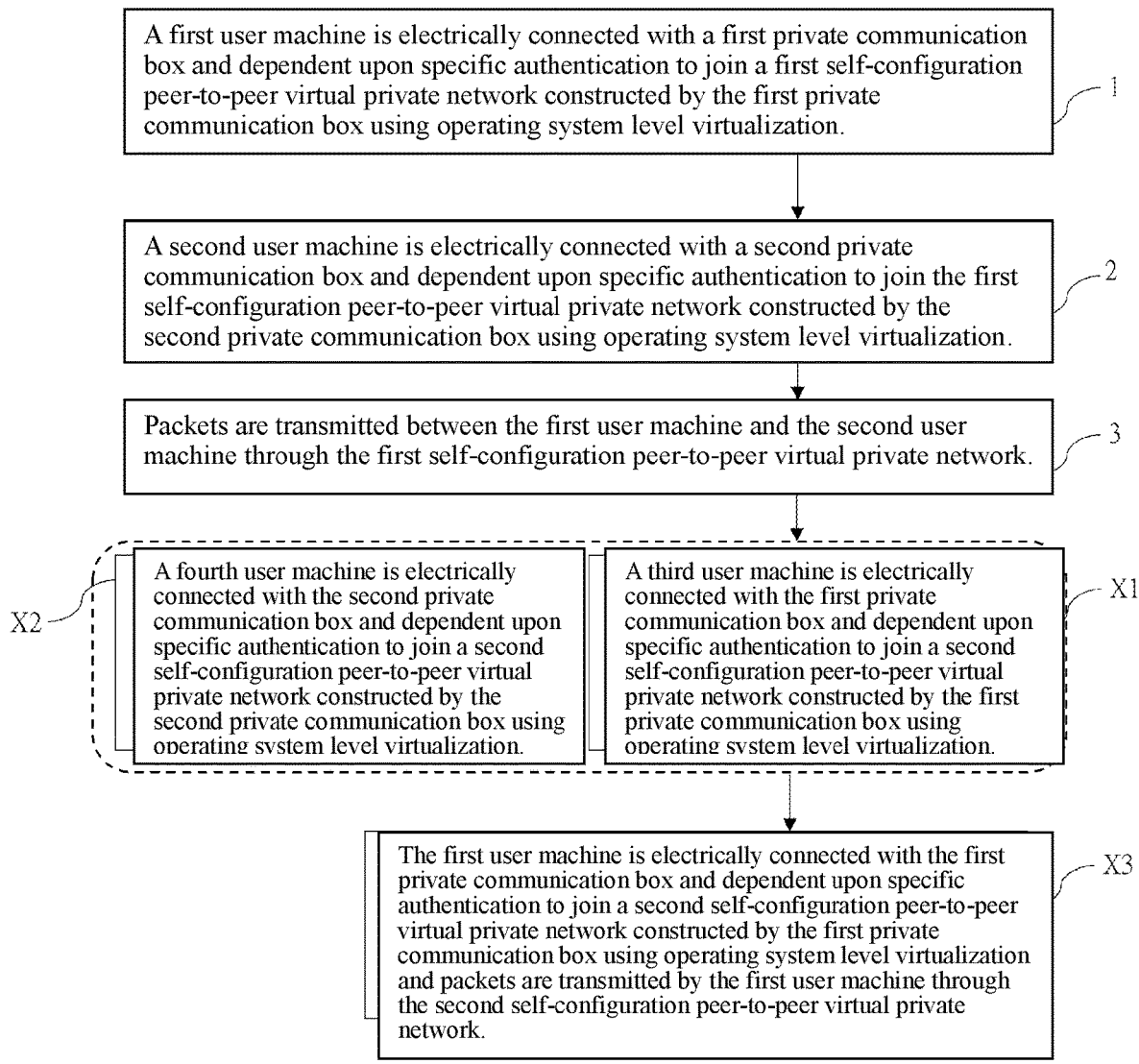
FIG. 1c is a flowchart of a method for construction of a high-security private group network in the third embodiment.
Figure 2C:
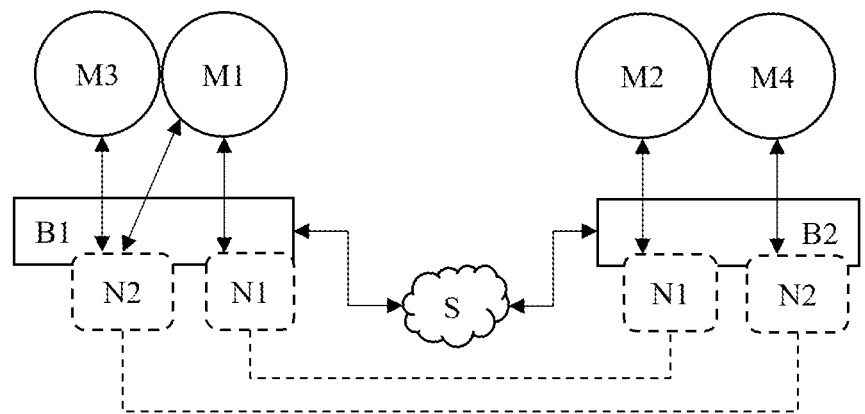
FIG. 2c is a schematic view of a method for construction of a high-security private group network in the third embodiment.

Referring to FIGS. 1c and 2c, which illustrate a method for construction of a high-security private group network in a third embodiment; in the third embodiment, the features in FIGS. 1c and 2c identical to those of the second embodiment in FIGS. 1b and 2b and the same symbols marked in FIGS. 1c and 2c are not explained repeatedly. Compared with the second embodiment, the method in the third embodiment comprises step X3 (X3) after steps of the second embodiment.

The flowchart in the third embodiment which refers to the flowchart in FIG. 1c comprises step 1 (1), step 2 (2), step 3 (3), step X1 (X1), step X2 (X2) and step X3 (X3) wherein step 1 (1), step 2 (2) and step 3 (3), step X1 (X1) and step X2 (X2) are identical to those steps in the second embodiment and not explained repeatedly.

Referring to step X3 (X3) in FIG. 1c and FIG. 2c, which explain step X3 (X3) as follows: the first user machine (M1) is electrically connected with the first private communication box (B1) and dependent upon specific authentication to join a second self-configuration peer-to-peer virtual private network (N2) constructed by the first private communication box (B1) using operating system level virtualization; packets are transmitted by the first user machine (M1) through the second self-configuration peer-to-peer virtual private network (N2).

In practice, the first user machine (M1) is an enterprise's file server. When the first user machine (M1) joins the second self-configuration peer-to-peer virtual private network (N2), facilities on the second self-configuration peer-to-peer virtual private network (N2) are allowed to access the first user machine (M1) as an enterprise's file server on the first self-configuration peer-to-peer virtual private network (N1).

Figure 1D:
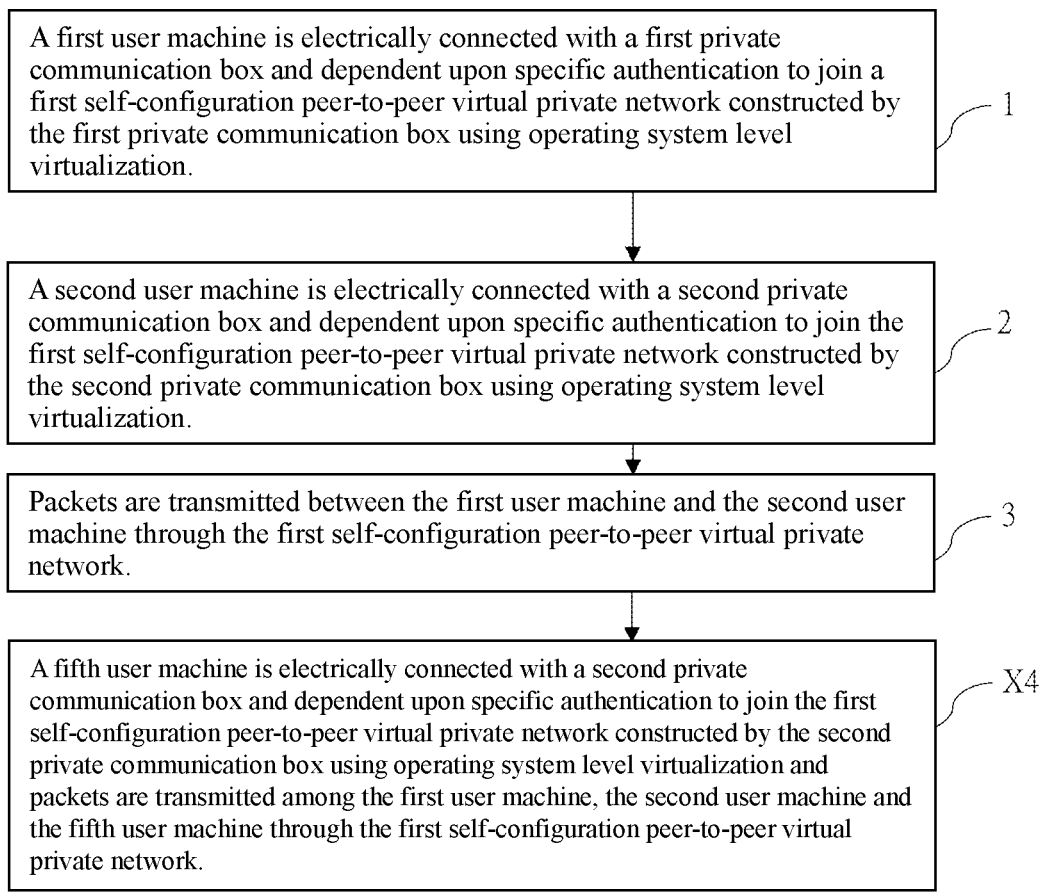
FIG. 1d is a flowchart of a method for construction of a high-security private group network in the fourth embodiment.
Figure 2D:
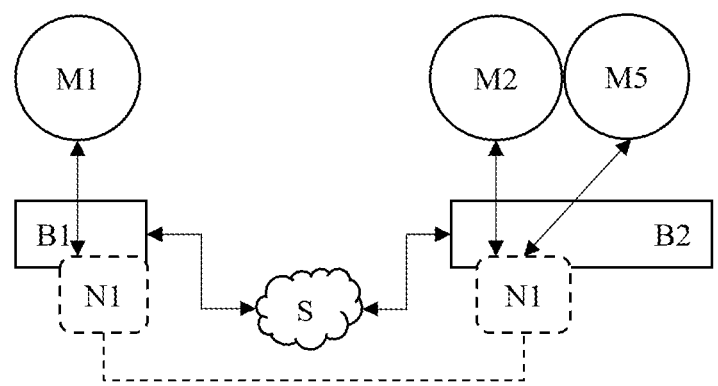
FIG. 2d is a schematic view of a method for construction of a high-security private group network in the fourth embodiment.

Referring to FIGS. 1d and 2d, which illustrate a method for construction of a high-security private group network in the fourth embodiment. In the fourth embodiment, the features in FIGS. 1*d* and 2*d* identical to those of the first embodiment in FIGS. 1*a* and 2*a* and the same symbols marked in FIGS. 1*d* and 2*d* are not explained repeatedly. Compared with the first embodiment, the method in the fourth embodiment comprises step X4 (X4) after step 3 (3) of the first embodiment.

The flowchart in the fourth embodiment which refers to the flowchart in FIG. 1*d* comprises step 1 (1), step 2 (2), step 3 (3) and step X4 (X4) wherein step 1 (1), step 2 (2) and step 3 (3) are identical to those steps in the first embodiment and not explained repeatedly.

Referring to step X4 (X4) in FIG. 1*d* and FIG. 2*d*, which explain step X4 (X4) as follows: a fifth user machine (M5) is electrically connected with the second private communication box (B2) and dependent upon specific authentication to join a first self-configuration peer-to-peer virtual private network (N1) constructed by the second private communication box (B2) using operating system level virtualization; packets are transmitted among the first user machine (M1), the second user machine (M2) and the fifth user machine (M5) through the first self-configuration peer-to-peer virtual private network (N1).

In practice, the second private communication box (B2) which can be installed on the intranet for an employee's residence accesses to the internet through an internal or external IP address; the fifth user machine (M5) is another employee's computer facility which assesses to the second private communication box (B2) through the intranet and dependent upon specific authentication to join the first self-configuration peer-to-peer virtual private network (N1) by specific authentication such that the fifth user machine (M5) joins the first self-configuration peer-to-peer virtual private network (N1). The explanation in the first embodiment continues in the fifth embodiment: data are exchanged among the first user machine (M1) as an enterprise's file server, the second user machine (M2) as an employee's computer facility, and the fifth user machine (M5) as another employee's computer facility on the first self-configuration peer-to-peer virtual private network (N1).

In summary, a method for construction of a high-security private group network in the present disclosure is different from an ordinary virtual private network and referred to as creative work in virtual private network applications that meets patentability and is applied for the patent.

It should be reiterated that the above descriptions present the preferred embodiments of a method for construction of a high-security private group network and any equivalent changes or modifications in specifications, claims or drawings still belong to the technical field within the present disclosure with reference to claims hereinafter.

What is claimed is:

1. A method for construction of a high-security private group network based on operating system level virtualization for construction of a virtual private network and comprising steps as follows:
    electrically connecting a first user machine with a first private communication box and dependent upon specific authentication to join a first self-configuration peer-to-peer virtual private network constructed by the first private communication box using operating system level virtualization;
    electronically connecting a second user machine with a second private communication box and dependent upon specific authentication to join the first self-configuration peer-to-peer virtual private network constructed by the second private communication box using the operating system level virtualization;
    transmitting packets between the first user machine and the second user machine through the first self-configuration peer-to-peer virtual private network;
    wherein the first private communication box and the second private communication box rely on a virtual private network based on operating system level virtualization to regulate a total number of connected facilities and transmission speeds for proper connection quality;
    wherein the first self-configuration peer-to-peer virtual private network is configured to bridge a local area network such that packets are transmitted to the local area network.

2. The method as claimed in claim 1 wherein a third user machine is electrically connected with the first private communication box and dependent upon specific authentication to join a second self-configuration peer-to-peer virtual private network constructed by the first private communication box using operating system level virtualization but packets are not transmitted between the second self-configuration peer-to-peer virtual private network and the first self-configuration peer-to-peer virtual private network.

3. The method as claimed in claim 1 wherein a fourth user machine is electrically connected with the second private communication box and dependent upon specific authentication to join a second self-configuration peer-to-peer virtual private network constructed by the second private communication box using operating system level virtualization but packets are not transmitted between the second self-configuration peer-to-peer virtual private network and the first self-configuration peer-to-peer virtual private network.

4. The method as claimed in claim 1 wherein the first user machine is electrically connected with the first private communication box and dependent upon specific authentication to join a second self-configuration peer-to-peer virtual private network constructed by the first private communication box using operating system level virtualization and packets are transmitted by the first user machine through the second self-configuration peer-to-peer virtual private network.

5. The method as claimed in claim 1 wherein a fifth user machine is electrically connected with a second private communication box and dependent upon specific authentication to join the first self-configuration peer-to-peer virtual private network constructed by the second private communication box using operating system level virtualization and packets are transmitted among the first user machine, the second user machine and the fifth user machine through the first self-configuration peer-to-peer virtual private network.

6. The method as claimed in claim 1 wherein each of the first private communication box and the second private communication box accesses to the internet for exchanges of network information with a login server.

7. The method as claimed in claim 1 wherein the specific authentication means each of an authentication code, a user account/password and an encryption key or a combination thereof.

8. The method as claimed in claim 2 wherein the first private communication box is capable of bridging the first self-configuration peer-to-peer virtual private network and the second self-configuration peer-to-peer virtual private network for one-way or two-way communication of packets.

* * * * *